(12) United States Patent
Kudoh

(10) Patent No.: US 8,587,866 B2
(45) Date of Patent: Nov. 19, 2013

(54) OPTICAL APPARATUS

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 556 days.

(21) Appl. No.: 12/845,136

(22) Filed: Jul. 28, 2010

(65) Prior Publication Data

US 2011/0032617 A1 Feb. 10, 2011

(30) Foreign Application Priority Data

Aug. 5, 2009 (JP) ................. 2009-182466

(51) Int. Cl.
*G02B 27/64* (2006.01)
*G03B 17/00* (2006.01)

(52) U.S. Cl.
USPC ............................. 359/557; 396/55

(58) Field of Classification Search
USPC .............................. 359/554, 557; 396/55, 421
See application file for complete search history.

(56) References Cited

U.S. PATENT DOCUMENTS

2006/0285839 A1* 12/2006 Tomita ............... 396/55
2007/0248344 A1* 10/2007 Santo et al. ............ 396/91

FOREIGN PATENT DOCUMENTS

| JP | 2007065040 A | * | 3/2007 |
| JP | 2007-219338 | | 8/2007 |
| JP | 2007-219375 A | | 8/2007 |

OTHER PUBLICATIONS

Machine translation of JP 2007065040 A.*

* cited by examiner

*Primary Examiner* — Stephone Allen
*Assistant Examiner* — Kimberly N Kakalec
(74) *Attorney, Agent, or Firm* — Cowan, Liebowitz & Latman, P.C.

(57) ABSTRACT

The optical apparatus includes a base member, a shift member holding an image stabilizing lens and movable in a direction orthogonal to an optical axis direction of the optical apparatus with respect to the base member, a biasing member biasing the shift member toward the base member in the optical axis direction, and an aperture stop unit disposed on a side opposite to the base member with respect to the shift member and adjusting an amount of light. The aperture stop unit includes a displacement preventing portion which makes contact with the shift member to prevent the shift member from being displaced toward the aperture stop unit.

3 Claims, 5 Drawing Sheets

OPTICAL APPARATUS

BACKGROUND OF THE INVENTION

1. Field of the Invention

The present invention relates to optical apparatuses such as digital still cameras, video cameras, interchangeable lenses and binoculars, and more particular to optical apparatuses including an optical image stabilizing (image blur correcting) function.

2. Description of the Related Art

The above-described optical apparatuses are often equipped with an optical image stabilizing unit which reduces (corrects) image blur caused by shake of the optical apparatus generated due to hand jiggling or the like. As disclosed in Japanese Patent Laid-Open No. 2007-219338, the optical image stabilizing unit shifts a lens (image stabilizing lens), which constitutes part of an image taking optical system or an observing optical system, in a direction orthogonal to an optical axis in synchronization with the shake of the optical apparatus.

However, in the optical apparatus disclosed in Japanese Patent Laid-Open No. 2007-219338, since the image stabilizing lens is biased by a spring toward a base member, an impact applied to the optical apparatus may cause the image stabilizing lens to be displaced to a side (for example, forward) opposite to the base member with deformation of the spring. The displaced image stabilizing lens may hit another lens disposed in a direction of the displacement of the image stabilizing lens.

In many conventional optical apparatuses, a lens holding member holding the image stabilizing lens is provided with a protrusion, and the protrusion makes contact with another lens disposed further forward than the image stabilizing lens when the image stabilizing lens (lens holding member) is displaced forward due to the impact. Such a configuration makes it possible to prevent the image stabilizing lens from directly hitting the other lens, which avoids damages of these lenses.

However, in an optical apparatus in which an aperture stop unit is disposed further forward than and adjacent to the image stabilizing lens, since the lens holding member holding the image stabilizing lens faces stop blades of the aperture stop unit, it is difficult to provide the above-described protrusion on the lens holding member.

SUMMARY OF THE INVENTION

The present invention provides an optical apparatus capable of preventing displacement of an image stabilizing lens caused by an impact or an external force in an optical axis direction.

The present invention provides as one aspect thereof an optical apparatus includes a base member, a shift member holding an image stabilizing lens and movable in a direction orthogonal to an optical axis direction of the optical apparatus with respect to the base member, a biasing member biasing the shift member toward the base member in the optical axis direction, and an aperture stop unit disposed on a side opposite to the base member with respect to the shift member and adjusting an amount of light. The aperture stop unit includes a displacement preventing portion which makes contact with the shift member to prevent the shift member from being displaced toward the aperture stop unit.

Other aspects of the present invention will become apparent from the following description and the attached drawings.

DESCRIPTION OF THE PREFERRED EMBODIMENTS

Exemplary embodiments of the present invention will be described hereinafter with reference to the accompanying drawings.

Embodiment 1

Figure 4:
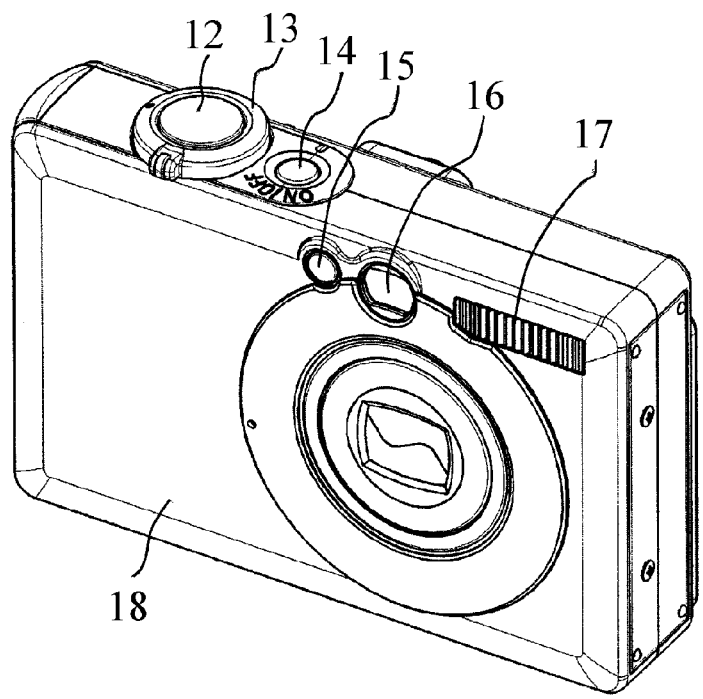
FIG. 4 is a perspective view of the camera (in the non-used state) of the embodiment.
Figure 5:
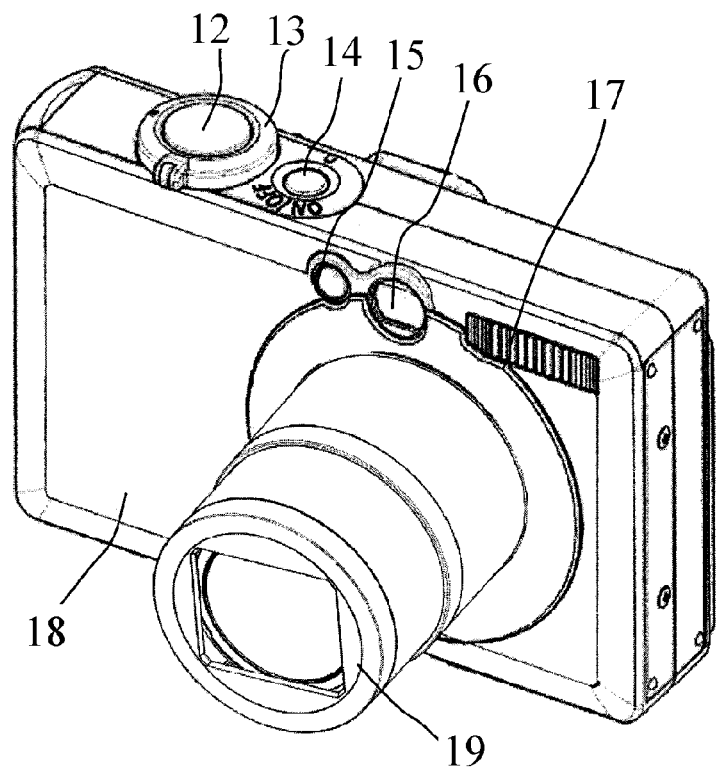
FIG. 5 is a perspective view of the camera (in the used state) of the embodiment.

FIGS. 4 and 5 show a digital still camera (hereinafter simply referred to as a "camera") as an optical apparatus that is an embodiment of the present invention. FIG. 4 shows the camera in a non-used state (lens retracted state) corresponding to a power-off state. FIG. 5 shows the camera in a used state (image capturable state) corresponding to a power-on state.

On a front face of the camera 18, a viewfinder objective window 16, a photometry/autofocus assist light emitting window 15, a strobe (flash) 17 and a lens barrel 19 are provided. The lens barrel 19 is retractable into a camera body as shown in FIG. 4, and protrudable from the camera body as shown in FIG. 5. The lens barrel protruding from the camera body extends and shortens to perform a zoom operation.

On a top face of the camera 18, a release switch 12, a power switch 14 and a zoom switch 13 are provided. Inside the camera 18, an image pickup element, a power supply (battery), and a recording medium such as a semiconductor memory are housed though they are not shown in the figures. Moreover, on a back face of the camera 18, a display unit displaying electronic viewfinder images and captured images, and various operation switches are provided though they are not shown in the figures.

Figure 6:
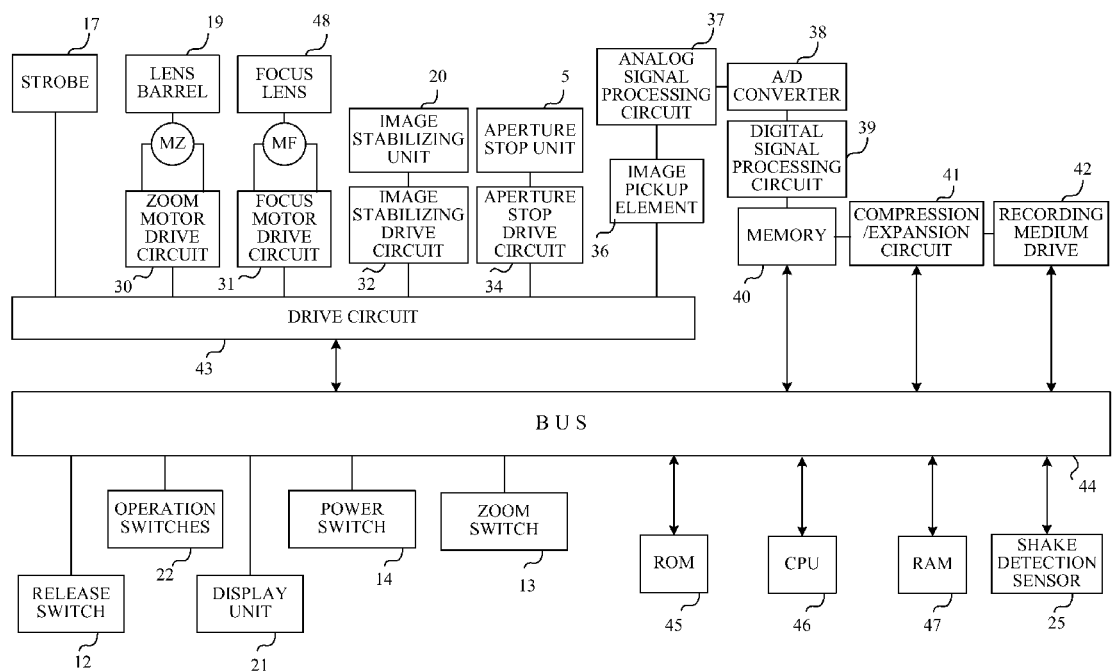
FIG. 6 is a block diagram showing an electrical configuration of the camera of the embodiment.

FIG. 6 shows an electrical configuration of the camera 18. A CPU 46, a ROM 45 and a RAM 47 constitute a controlling part (controller). The CPU 46, the ROM 45 and the RAM 47 are connected via a bus 44 with various components in the camera 18 such as the release switch 12, the zoom switch 13, the power switch 14, the above-described various operation switches 22, the above-described display unit 21, a memory 40, a compression/expansion circuit 41, a recording medium drive 42 and a drive circuit 43.

The drive circuit 43 causes a zoom motor drive circuit 30, a focus motor drive circuit 31, an image stabilizing drive circuit 32, an aperture stop drive circuit 34, the above-described image pickup element 36 and the above-described strobe 17 to activate on the basis of instructions from the CPU 46. The zoom motor drive circuit 30 drives a zoom motor $M_Z$ to extend and shorten the lens barrel 19, thereby changing a focal length of an image taking optical system housed in the lens barrel 19. The focus motor drive circuit 31 drives a focus motor $M_F$ to move in an optical axis direction a focus lens 48 included in the image taking optical system, thereby causing the focus lens 48 to perform focusing.

The image stabilizing drive circuit 32 drives an image stabilizing unit 20 to reduce (correct) image blur caused by shake of the camera 18 (hereinafter referred to as "camera shake") generated due to hand jiggling or the like. The aperture stop drive circuit 34 drives stop blades of an aperture stop unit 5 in an open-and-close direction to change a diameter of an aperture (hereinafter referred to as a "stop aperture") being formed by the stop blades, thereby adjusting an amount of light passing through the stop aperture The image pickup element 36 is constituted by a CCD sensor or a CMOS sensor, and photoelectrically converts an object image formed by the image taking optical system housed in the lens barrel 19 to output image pickup signals. The image pickup signals which are analogue signals are input to an A/D converter 38 through an analog signal processing circuit 37 to be converted into digital signals. A digital signal processing circuit 39 performs various image processing on the digital signals to create digital image data (an electronic viewfinder image or an captured image). The digital image data is displayed on the display unit 21 through the memory 40, or is compressed by the compression/expansion circuit 41 to be recorded in the recording medium through the recording medium drive 42.

Figure 1:
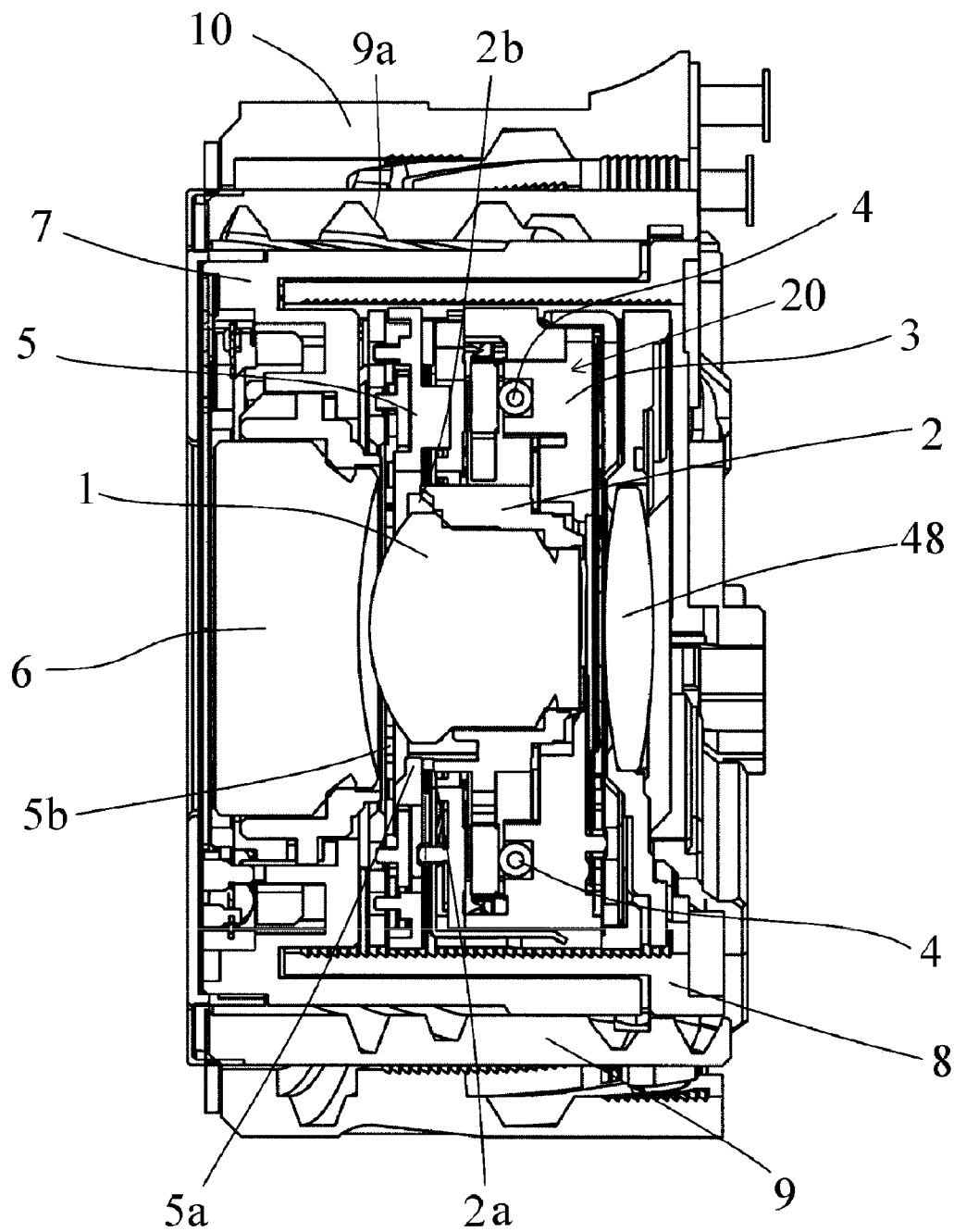
FIG. 1 is a cross sectional view of a lens barrel of a camera (in a non-used state) which is an embodiment of the present invention.
Figure 2:
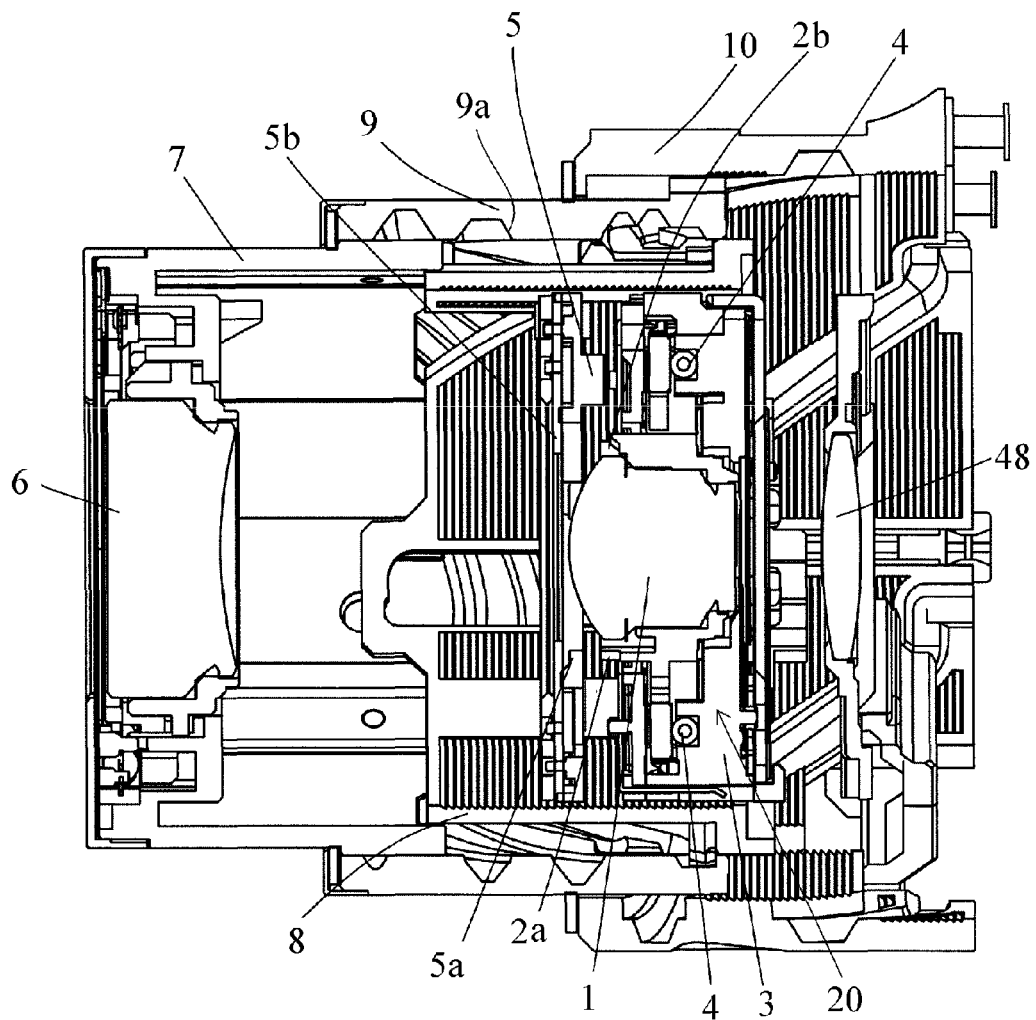
FIG. 2 is a cross sectional view of the lens barrel of the camera (in a used state) of the embodiment.
Figure 3:
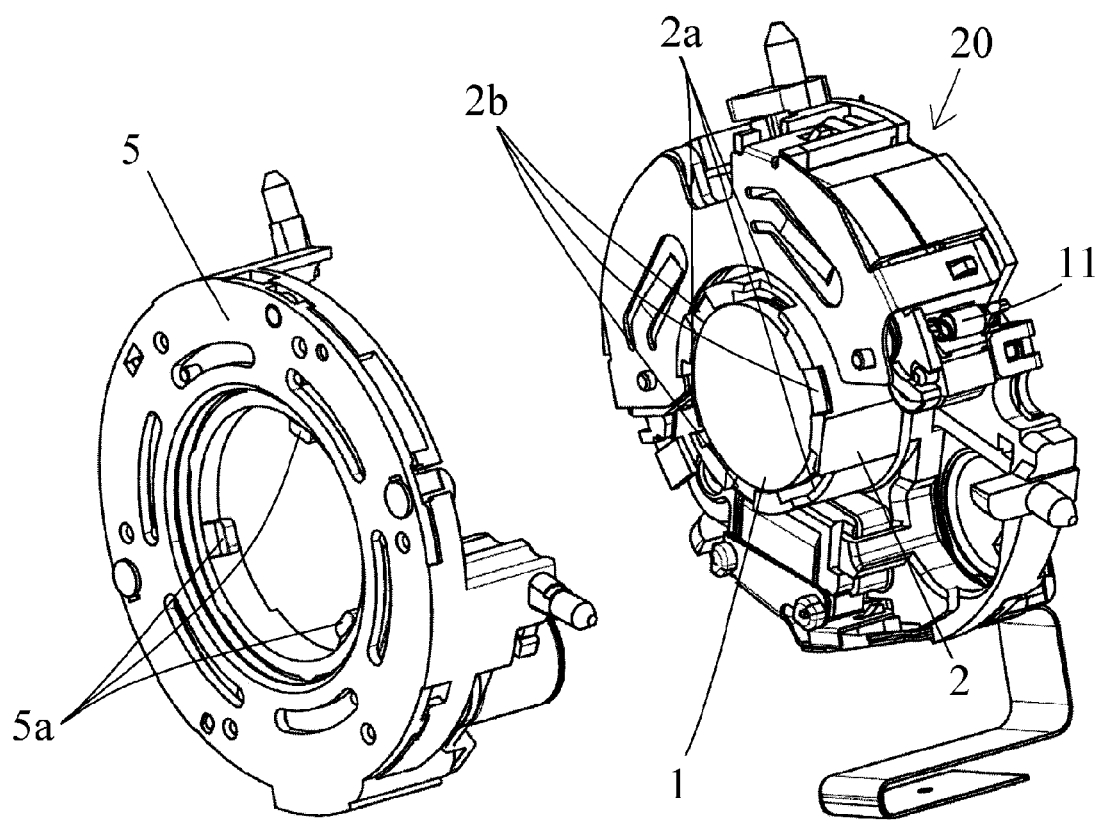
FIG. 3 is a perspective view of an aperture stop unit and an image stabilizing unit installed in the camera of the embodiment.

Next, description will be made of a configuration of the lens barrel 19 with reference to FIGS. 1, 2 and 3. FIGS. 1 and 2 respectively show the lens barrel 19 in the non-used state and the used state shown in FIGS. 4 and 5. FIG. 3 shows the aperture stop unit 5 and the image stabilizing unit 20 disposed in the lens barrel 19.

The image stabilizing unit 20 includes a shift base 3 serving as a base member, an image stabilizing lens 1 constituting part of the image taking optical system, and a shift frame 2 serving as a shift member and holding the image stabilizing lens 1. The shift frame 2 is shiftable (movable) with respect to the shift base 3 in a shift direction orthogonal to an optical axis direction of the image taking optical system (that is, of the camera 18).

This embodiment shows a case where the shift direction is the direction orthogonal to the optical axis direction. However, the shift direction is not necessarily needed to be a direction strictly orthogonal to the optical axis direction. In other words, the shift direction may be a direction including a directional component orthogonal to the optical axis direction such as a direction slightly inclining with respect to the direction orthogonal to the optical axis direction and a direction having a curvature.

The shift direction that is the direction orthogonal to the optical axis direction includes a pitch direction corresponding to a vertical direction or an up-and-down direction and a yaw direction corresponding to a horizontal direction or a right-and-left direction.

Plural balls 4 are disposed between the shift frame 2 and the shift base 3. The shift frame 2 is biased toward the shift base 3 (that is, to a base member side) by a spring 11 serving as a biasing member. Therefore, the shift frame 2 is pressed against the shift base 3 via the balls 4 and guided in the shift direction (pitch and yaw directions) by rolling of the balls 4.

At two places on the shift frame 2 whose phases around the optical axis are different from each other by 90 degrees, two magnets (not shown) are fixed. Further, at two places on the shift base 3 facing the two magnets, two coils (not shown) are fixed. One of the two magnets and one of the two coils facing each other constitute a pitch shift actuator which shifts the shift frame 2 in the pitch direction with respect to the shift base 3. The other of the two magnets and the other of the two coils facing each other constitute a yaw shift actuator which shifts the shift frame 2 in the yaw direction with respect to the shift base 3.

A shake detection sensor 25 shown in FIG. 6 is constituted by an angular velocity sensor or the like, and detects the camera shake in the pitch and yaw directions. The CPU 46 controls energization of the coils of the pitch and yaw shift actuators on the basis of outputs from the shake detection sensor 25. Thereby, the shift frame 2 is shifted with the image stabilizing lens 1 in the pitch and yaw directions to correct the image blur.

In FIGS. 1 and 2, a first lens 6 is disposed further on an object side (further forward) than the image stabilizing lens 1. The first lens 6 is held by a first lens holding barrel 7.

The first lens holding barrel 7 and the shift base 3 respectively engage with a straight groove portion (not shown) formed on a guiding barrel 8 so as to extend in the optical axis direction. A cam barrel is disposed at an outer circumference of the first lens holding barrel 7, the cam barrel 9 being rotatable around the optical axis. Cam groove portions 9a are formed on an inner circumferential surface of the cam barrel 9. Cam followers (not shown) provided on outer circumferential portions of the first lens holding barrel 7 and the shift base 3 respectively engage with the cam groove portions 9a. Therefore, rotation of the cam barrel 9 moves the first lens holding barrel 7 and the shift base 3 (in other words, the first lens 6 and the image stabilizing unit 20) in the optical axis direction.

The cam barrel 9 is rotated with respect to a fixed barrel 10 disposed at an outer circumference of the cam barrel 9 to be moved in the optical axis direction by a cam groove portion (not shown) formed on an inner circumferential surface of the fixed barrel 10. Therefore, each of the first lens 6 and the image stabilizing unit 20 is moved in the optical axis direction by a combined movement amount of a movement amount obtained by the cam groove portion of the cam barrel 9 and a movement amount of the cam barrel 9 being moved by the cam groove portion of the fixed barrel 10. Thus, the lens barrel 19 extends and shortens between the non-used state shown in FIG. 1 and the used state (wide-angle state) shown in FIG. 2, and extends and shortens between the wide-angle state and a telephoto state in the used state to perform the zoom operation.

Moreover, in the lens barrel 19, the aperture stop unit 5 is disposed on a side opposite to the shift base 3 with respect to the shift frame 2 (that is, on an opposite side to a direction in which the spring 11 biases the shift frame 2). In other words, the aperture stop unit 5 is disposed between the first lens 6 and the image stabilizing unit 20 in the optical axis direction.

As described above, the shift frame 2 holding the image stabilizing lens 1 is pressed against the shift base 3 by a biasing force of the spring 11. However, when an impact or a large external force is applied to the camera 18, the shift frame 2 may be displaced forward so as to separate from the shift base 3 against the biasing force of the spring 11. In this case, when the lens barrel 19 is in the non-used state shown in FIG. 1, the shift frame 2 may hit the stop blades 5b of the aperture stop unit 5, or the image stabilizing lens 1 displaced forward with the shift frame 2 may hit the first lens 6.

Thus, this embodiment employs the following configuration to prevent such forward displacement of the shift frame 2 in the non-used state while shortening a length of the lens barrel 19 in the optical axis direction in the same state as much as possible.

First, in the non-used state, the diameter of the stop aperture formed by the stop blades 5b in the aperture stop unit 5 is made larger than an optical maximum diameter of the stop aperture which is a largest diameter optically used for image capturing, and a front portion of the image stabilizing lens 1 is inserted into the stop aperture larger than the optical maximum diameter. In other words, in the camera 18 changeable between the lens retracted state and the image capturable state, the image stabilizing lens 1 and the aperture stop unit 5 are at least partially overlapped with each other in the optical axis direction in the lens retracted state.

In such a configuration, when the impact or the large external force is applied to the camera 18, it is highly possible that the shift frame 2 displaced forward will hit the stop blades 5b or the image stabilizing lens 1 will hit the first lens 6.

Thus, in this embodiment, as shown in FIG. 3, protrusion portions 5a are provided at three circumferential places (three places around the optical axis) on the aperture stop unit 5. The protrusion portions 5a serving as displacement preventing portions make contact with the shift frame 2 to prevent the shift frame 2 from being displaced toward the aperture stop unit 5. Further, groove portions 2a into which the protrusion portions 5a are inserted are formed at three places around the image stabilizing lens 1 on the shift frame 2. Contact of the protrusion portions 5a with optical-axis-direction end surfaces among inner surfaces of the groove portions 2a prevents the shift frame 2 from being displaced forward. Moreover, engagement of the protrusion portions 5a with the groove portions 2a in a circumferential direction prevents the shift frame 2 from being displaced around the optical axis.

Such a configuration can prevent the shift frame 2 and the image stabilizing lens 1 from being displaced forward due to the impact or the large external force in the non-used state, which can avoid the hit of the shift frame 2 against the stop blades 5b and the hit of the image stabilizing lens 1 against the first lens 6. Accordingly, this embodiment can achieve a high impact-resistant camera.

The groove portions 2a formed on the shift frame 2 are also used as portions into which a tool for correcting (adjusting) decentering of the image stabilizing lens 1 with respect to the shift frame 2 is inserted when the image stabilizing lens 1 is attached to the shift frame 2. The use of such groove portions 2a also as portions into which the protrusion portions 5a are inserted makes it possible to prevent the shift frame 2 from being displaced forward and around the optical axis without complicating a shape of the shift frame 2.

Moreover, bonding portions 2b where the image stabilizing lens 1 is bonded and fixed after the decentering correction thereof are provided at three circumferential places on the shift frame 2.

Furthermore, in the used state shown in FIG. 2, the aperture stop unit 5 and the image stabilizing unit 20 are apart from each other in the optical axis direction, and therefore the image stabilizing lens 1 is moved outside (rearward) from the stop aperture. Thus, the stop blades 5b can be narrowed.

As described above, this embodiment can prevent the displacement of the shift frame 2 and the image stabilizing lens 1 toward the aperture stop unit 5 in the optical axis direction due to the impact and the external force in the non-used state. Therefore, even in a camera in which the image stabilizing lens 1 is inserted into the stop aperture in the non-used state, it is possible to prevent the shift frame 2 and the image stabilizing lens 1 from hitting the stop blades 5b and the other lens (first lens 6), which can achieve a high impact-resistant camera.

Although in the above embodiment description has been made of the digital still camera, alternative embodiments of the present invention include other optical apparatuses such as a video camera, an interchangeable lens and binoculars.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Patent Application No. 2009-182466, filed on Aug. 5, 2009, which is hereby incorporated by reference herein in its entirety.

What is claimed is:

1. An optical apparatus comprising:
   a base member;
   a shift member configured to hold an image stabilizing lens and configured to be movable in a direction orthogonal to an optical axis direction of the optical apparatus with respect to the base member, wherein the shift member is provided with a groove portion for adjusting a position of the image stabilizing lens with respect to the shift member;
   a biasing member configured to bias the shift member toward the base member in the optical axis direction; and
   an aperture stop unit disposed on a side opposite to the base member with respect to the shift member and configured to adjust an amount of light,
   wherein the aperture stop unit is configured to include a displacement preventing portion which is provided inside an aperture of the aperture stop and is inserted into the groove portion to prevent the shift member from being displaced toward the aperture stop unit in the optical axis direction.

2. The optical apparatus according to claim 1,
   wherein the optical apparatus is changeable between a retracted state and an image capturable state, and
   wherein the image stabilizing lens is inserted into the aperture of the aperture stop unit in the retracted state, and the displacement preventing portion makes contact with end surfaces on the optical axis direction side that are part of the shift member in the retracted state.

3. An image capturing apparatus comprising the optical apparatus according to claim 1.

* * * * *